United States Patent Office 3,252,958
Patented May 24, 1966

3,252,958
PROCESS FOR POLYMERIZING ALPHA-OLEFINS IN THE PRESENCE OF ACTIVATED TiCl₃, ALUMINUM DIALKYL MONOHALIDE AND A ZINC ALKYL HALIDE
Ettore Giachetti and Renato Serra, Milan, and Giorgio Moretti, Ferrara, Italy, assignors to Montecatini Società Generale per l'Industria Mineraria e Chimica, Milan, Italy, a corporation of Italy
No Drawing. Filed May 25, 1962, Ser. No. 197,569
Claims priority, application Italy, May 19, 1961, 9,826/61
5 Claims. (Cl. 260—93.7)

The present invention relates to a process for polymerizing alpha-olefins in the presence of highly stereospecific catalystic systems.

More particularly, the present invention relates to a method for regulating the molecular weight of poly-alpha-olefins obtained from these catalytic systems.

Catalytic systems having a high stereospecificity for polymerizing alpha-olefins containing activated $TiCl_3$ and aluminum dialkyl monohalides are known.

These systems, however, lead to the production of polymers with very high molecular weights. By suitably varying operating conditions, such as pressure and temperature (in contrast to what happens with the conventional catalysts containing $TiCl_3$ and aluminum trialkyls), the molecular weight can be varied considerably; however, by using this procedure a remarkable decrease in the stereospecificity and yield also occurs.

Molecular weight regulatory processes which are not based on control of the operating conditions, but which rely on the use of particular agents (such as, $H_2$, zinc dialkyls) are effective in case of catalytic systems such as $TiCl_3$-aluminum trialkyls.

Hydrogen also has a positive action in the regulation of the molecular weight when catalysts containing aluminum dialkylmonohalides and activated $TiCl_3$ are employed. This use of hydrogen, however, presents several drawbacks due to the difficulty in controlling and maintaining constant the hydrogen partial pressure in the reactor which is necessary in order to obtain a homogeneous product.

The regulating of the molecular weight by using zinc dialkyls, which can be more easily controlled, on the other hand, causes a considerable decrease in the isotacticity of the polymer when this expedient is applied to these catalytic systems. This can be due to the particular reactivity of the activated $TiCl_3$ with zinc dialkyls, which results in structural modifications of the $TiCl_3$ itself.

It is therefore an object of the present invention to provide an improved process for polymerizing alpha-olefins with catalytic systems containing activated $TiCl_3$ and $AlR_2X$ (wherein R is an alkyl group and X is a halogen atom), which makes it possible to regulate the molecular weight of the polymer by means of an easily controllable agent, without at the same time lowering the stereospecificity of the process.

A further object is to provide poly-alpha-olefins having a controlled molecular weight.

Further objects and advantages of the invention will become hereinafter apparent.

We have surprisingly found that certain zinc compounds when added to a catalytic system of the aforementioned type cause a decrease in the molecular weight of the polymer without substantially altering the stereospecificity of the catalysts and the polymer yields.

These zinc compounds, which are solid and soluble in the polymerization medium and therefore are easily added, are the products of the reaction between 1 mole of $ZnX_2$ and 1 mole of $ZnR_2$, preferably 1.15 moles of $ZnX_2$ and 1 mole of $ZnR_2$, wherein R is an alkyl group having from 1 to 4 carbon atoms and X is a halogen atom.

These compounds can be represented by the formula:

$$(RZnX)_n$$

wherein X is a halogen atom, preferably chlorine, R is an alkyl group containing up to 4 carbon atoms and $n$ indicates that the product is in polyassociated form. Although the exact value for $n$ is not known with certainty, it has been shown that the product possessed the above formula.

A compound of this type, such as that obtained from $ZnEt_2$ (in which Et is an ethyl group) and which upon analysis is shown to have the formula $(EtZnCl)_n$, has not been isolated heretofore. This compound is a white solid having a melting point of 59–61° C., which is quickly altered in the presence of air. It is obtained by directly reacting at 60–70° C. an excess of $ZnCl_2$ with concentrated $ZnEt_2$.

The product is soluble in toluene and less soluble in heptane, and can therefore be purified by recrystallization from the latter solvent.

Upon heating under vacuum above certain temperatures depending upon the absolute pressure, the product undergoes a decomposition into $ZnCl_2$ and $ZnEt_2$, which distills off.

The compound $(EtZnCl)_n$ can be obtained by reacting $ZnEt_2$ with $ZnCl_2$ at 70° C. for 70 minutes. $ZnCl_2$ is used in a molar excess of 10–15% in order to insure quantitative exchange. The reaction product is at room temperature a clear friable solid. The reaction itself is moderately exothermic.

In order to effect purification, the raw product is dissolved in a warm, low-boiling, anhydrous, hydrocarbon solvent, such as, hexane (boiling point =60° C.) or, even better, pentane (boiling point=35–45° C.). The warm solution, which is made clear by decantation, is siphoned and concentrated at room temperature (head temperature 60°; bath temperature up to 100° C. in the case of hexane).

A white crystalline product, substantially free of hexane is thus obtained in a yield of 90%.

A small fraction of the crystallized product, after a drying with warm pure nitrogen, gives the following analytical results:

Zn=48.9 g./100 g. (theoretical=50.37)
Cl=27.6 (theoretical=27.3%)
G. atom Cl/g. atom Zn=1.04

The melting point of the raw product equals 59.6° C., while the melting point of the product crystallized by the evaporation of hexane equals 60.2° C.

We have found that during the polymerization it is convenient to keep the concentration of the $(RZnX)_n$ in the polymerization medium constant. For this purpose a diluted solution may, for example, be fed continuously or batchwise into the reactor during the whole time of polymerization, in order to make up for the amount of molecular weight regulating compound consumed during the polymerization. This addition of further amounts of regulator is particularly important in case of the long polymerization runs. The minimum amount of $(RZnEt)_n$ which can be used to regulate the molecular weight is 0.05 g./l. solvent.

The process of the present invention may be used, in general, in the polymerization of higher-alpha-olefins such as those of the formula, $R$—$CH$=$CH_2$, wherein R is an alkyl, aryl or cycloalkyl group, including propylene, butene, pentene, 4-methyl-pentene, hexene, etc., styrene, substituted styrenes, vinyl cyclohexane and the like.

These poly-alpha-olefins, which possess a regularity of steric structure, have wide application in the plastic field and may be used in fibers, films and other manufactured shaped articles.

The following examples are given to illustrate the present invention without limiting its scope.

EXAMPLES 1-5

Into a 5-liter vertical autoclave provided with a mechanical agitator and kept at 75° C. by oil circulation, 2 liters of n-heptane dried on alumina are introduced together with a catalyst pre-formed in a glass vessel using the following procedure:

2 g. of activated $TiCl_3$ are suspended in 25 cc. of benzene and there is then added 4.8 g. of $AlEt_2Cl$, diluted with benzene, and various amounts of the compound $(EtZnCl)_n$, which is prepared as described above, and dissolved in benzene.

Propylene is then introduced up to a pressure of 3 atmospheres and this pressure is kept constant during the entire run.

During the run a benzene solution of $(EtZnCl)_n$ is also introduced into the autoclave at regular intervals in the amounts reported in Table 1.

After 10 hours, the polymerizaion is stopped and the polymer is discharged, washed with methanol, dried and weighed.

A determination of the intrinsic viscosity in tetrahydronaphthalene at 135° C. and of the residue after extraction with boiling heptane of the polymer is then carried out.

The results are reported in Table 1.

Table 1

| Activated $TiCl_3$ | g | 2 |
| AlEt$_2$Cl | g | 4.8 |
| Heptane | cc | 2000 |
| Propylene pressure | atm | 3 |
| Temperature | ° C | 75 |
| Time | hours | 10 |

| Example | (EtZnCl) initially introduced (g.) | (EtZnCl) introduced during the run (g.) | Polymer (g.) | Residue after heptane extraction (percent) | |
|---|---|---|---|---|---|
| 1 | | | 1,200 | 91 | 5.2 |
| 2 | 0.2 | 0.2 | 920 | 87.0 | 3.4 |
| 3 | 0.3 | 0.3 | 660 | 91.5 | 2.8 |
| 4 | 0.4 | 0.4 | 720 | 84.0 | 2.2 |
| 5 | 0.5 | 0.5 | 460 | 86.5 | 1.8 |

The following Example 6 is given in order to illustrate the lower efficiency of $ZnEt_2$ with respect to $(EtZnCl)_n$, as the molecular weight regulator of a polypropylene obtained with a catalytic system containing aluminum diethyl monochloride and activated $TiCl_3$.

EXAMPLE 6

Into a 5-liter autoclave provided with a mechanical agitator and kept at 75° C. by oil circulation, 2 liters of heptane dried on alumine are introduced together with the catalyst preformed in a glass vessel as follows: 2.0 g. of activated $TiCl_3$ are suspended in 25 cc. of benzene, 4.8 g. of $AlEt_2Cl$ and 0.3 g. of $ZnEt_2$, both diluted with benzene, are then added.

Propylene is introduced up to a pressure of 3 atm., which pressure is kept constant for the entire polymerization.

Moreover, during the run, 0.7 g. of $ZnEt_2$ are added in small portions at regular intervals of time.

After 10 hours, the polymerization is stopped by discharging the polymer which is then washed with methanol and dried.

320 g. of polypropylene having an intrinsic viscosity, determined in tetrahydronaphthalene at 135° C., of 1.8 and a residue after extraction with boiling heptane of 80.7% are obtained.

By comparing this run with those of Examples 2-5 which are carried out using the same amount of catalyst and employing ZnEtCl as the molecular weight regulator, there is noted a considerable decrease in the yield (320 g. of polymer versus 920 to 460 g.) and in the isotacticity index 80.7 versus 87-86.5.

It can therefore be seen that by employing the present invention it is possible to achieve not only a simple and easily controllable molecular weight regulation, but also good yields of highly stereospecific poly-alpha-olefins.

Many variations and modifications can, of course, be practiced without departing from the spirit and scope of the present invention.

Having thus described the present invention, what it is desired to secure and claim by Letters Patent is:

1. A process for the polymerization of alpha-olefins of the formula R—CH=CH$_2$, where R is selected from the group consisting of alkyl, aryl and cycloalkyl, in the presence of highly stereospecific catalytic systems containing an aluminum dialkyl monohalide and activated $TiCl_3$ characterized in that the molecular weight of the poly-alpha-olefin is regulated by carrying out the polymerization in the presence of a compound of the formula:

$$(RZnX)_n$$

wherein R is an alkyl group containing 1 to 4 carbon atoms, X is a halogen atom and $n$ indicates that the compound is a polyassociation product, said compound being obtained by reacting $ZnR_2$ and $ZnX_2$ in a molar ratio of 1:1 to 1:15.

2. A polymerization process according to claim 1, wherein R represents an ethyl group.

3. A polymerization process according to claim 1, wherein X represents a chlorine atom.

4. A polymerization process according to claim 1, wherein aluminum diethyl monochloride is used as the aluminum dialkyl monohalide.

5. A polymerization process according to claim 1, wherein propylene is used as the alpha-olefin.

References Cited by the Examiner

UNITED STATES PATENTS 3,035,035  5/1962  Mensikova et al. _____ 260—94.9

FOREIGN PATENTS 572,726  11/1958  Belgium.
820,264  9/1959  Great Britain.

JOSEPH L. SCHOFER, *Primary Examiner.*